Sept. 5, 1961          J. M. JORDAN          2,998,844

VAPOR LOCK REDUCTION DEVICE FOR AUTOMOTIVE VEHICLES

Filed Sept. 16, 1959          2 Sheets-Sheet 1

JOHN M. JORDAN     INVENTOR

BY *W. O. Heilman*

PATENT ATTORNEY

Sept. 5, 1961 J. M. JORDAN 2,998,844
VAPOR LOCK REDUCTION DEVICE FOR AUTOMOTIVE VEHICLES
Filed Sept. 16, 1959 2 Sheets-Sheet 2

JOHN M. JORDAN INVENTOR

BY

PATENT ATTORNEY

United States Patent Office 2,998,844
Patented Sept. 5, 1961

2,998,844
VAPOR LOCK REDUCTION DEVICE FOR AUTOMOTIVE VEHICLES
John M. Jordan, Plainfield, N.J., assignor to Esso Research and Engineering Company, a corporation of Delaware
Filed Sept. 16, 1959, Ser. No. 840,432
7 Claims. (Cl. 158—36.3)

The present invention is concerned with a device adapted to minimize the occurrence of vapor lock in the fuel delivery system of an engine for the propulsion of automotive vehicles. In particular, the invention relates to such apparatus employed in the fuel delivery system of an automobile engine, using volatile liquid fuels such as gasoline.

Vapor lock for the purpose of the present description may generally be defined as a condition in which the capacity of a fuel delivery system, including the fuel pump therein, is reduced to the point where either the supply of liquid fuel to the pump is completely blocked by vapors formed in the system, or where the supply is so reduced by excessive vaporization as to reduce the liquid volume supplied to the carburetor to a level below that required to maintain an adequate fuel-air ratio in the engine combustion chambers. Ordinarily, vapor lock is the result of excessively high temperatures in the fuel delivery system, such as may be produced by extended idle operation of the vehicle engine, or by extended periods of operation at high speed followed by a soak period, or a high load running. The condition is manifested by stalling and hard starting, particularly when fuel in the system is subjected to "heat soaking" in the engine compartment, at temperatures approximating the boiling points of the lower boiling fuel component fractions. Further manifestations of the condition are loss of power, and misfiring during acceleration when larger amounts of fuel are needed for smooth performance. The vapor-lock conditions, caused by high operating temperatures, may be severely aggravated by the inertial effect on liquid fuel in the system resulting from sudden starts and rapid acceleration.

It is the object of the present invention to provide means to overcome some deficiencies of the conventional fuel delivery system, whereby the vapor lock condition caused by high operating temperatures, is reduced or minimized. It is a further object of this invention to promote the flow of a liquid fuel to the fuel pump in an automobile fuel delivery system during periods of starting or acceleration.

The invention and its objects may be more fully understood from the following description, when it is read with reference to the accompanying drawings, wherein.

Figure 1:
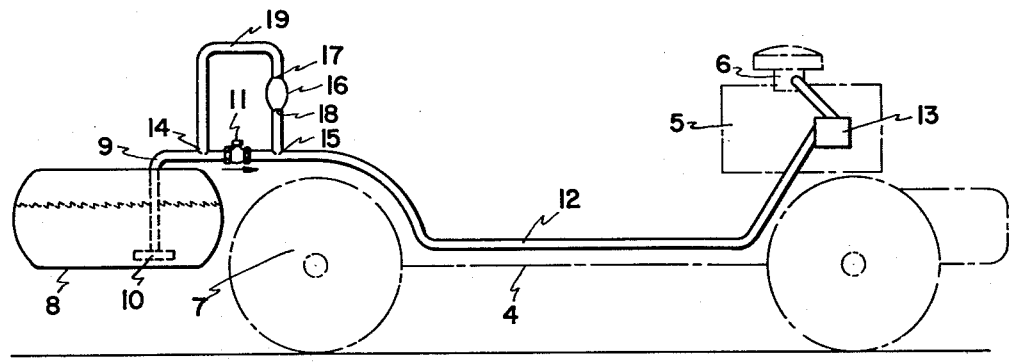
FIG. 1 is a schematic showing of a typical automotive fuel delivery system with the present invention included in the said system, which system comprises a liquid fuel pump, a storage tank for liquid fuel, a liquid fuel delivery conduit, and the present inventive apparatus.

Referring now to the drawings in greater detail, the numeral 4 designates an automobile chassis. In the drawings, the chassis is shown in dotted lines to provide points of reference, with the central portion of said automobile chassis being omitted. An internal combustion engine 5, having a carburetor 6, is conventionally disposed at the front end of the chassis, while numeral 7 designates the rear axle portion of said automobile chassis. The numeral 8 designates a liquid fuel storage tank, conventionally located at the rear of the chassis 4, and having an outlet conduit 9 communicating with a typical intake device 10, located within the tank, and said outlet conduit 9 terminating at a check valve 11. This check valve 11 is so disposed as to allow the flow of liquid fuel in one direction, said direction being from a liquid fuel storage container 8 toward the fuel pump 13. The main fuel conduit is shown as numeral 12, and represents that conduit commencing at the check valve 11, and communicating with the inlet or suction side of the liquid fuel pump 13. Thus far the description, not including the check valve 11, has been that of a conventional fuel delivery system. The device that forms the basis of the present invention communicates with the outlet conduit 9 and the main fuel conduit 12 on either side of the check valve 11 at points 14 and 15, and is represented as a U-shaped fuel conduit by-pass attachment 19 which rises in a vertical or upward direction, and which has disposed on the upper portion of that leg of the U-shaped fuel conduit bypass attachment, which is between the check valve and the liquid fuel pump and nearer the fuel pump, a liquid fuel collection container or bulb 16, having an upper 17 and a lower 18 communication with the bypass fuel conduit.

Figure 2:
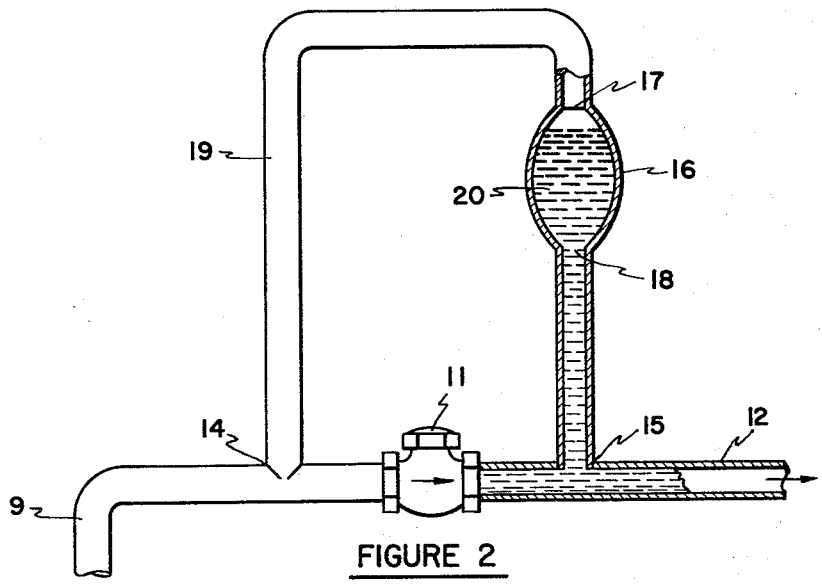
FIG. 2 is a schematic showing of a featured part of the fuel delivery system as shown in FIG. 1, which device forms the basis of the present invention.

FIG. 2 represents a reduced scale drawing of the present inventive apparatus which device has been described above and illustrated in its preferred position in the fuel delivery system of an automotive vehicle. This device comprises a vertical by-pass fuel line conduit, a liquid fuel collection container or bulb, and a check valve allowing liquid flow in one direction. FIG. 2 further illustrates a typical condition in the use of said device wherein "heat soaking" of the main fuel conduit has resulted in vaporization of some of the liquid fuel so that the liquid fuel 20 in the main fuel conduit 12 has been forced up into the collection container 16.

"Heat soaking" occurs in the operation of an automotive liquid fuel delivery system when the automotive vehicle is idled after a prolonged period of time or when the automobile is idled or stopped after prolonged periods of either high speed or stop-and-go operation so that the temperature of the engine compartment approximates temperatures which will vaporize the lower boiling portions of fuel used in the system. The effect of heat on the liquid fuel in the fuel pump and the fuel line causes vaporization of the fuel with the unvaporized liquid gasoline or fuel in the main fuel conduit being forced back through the main fuel conduit toward the main storage tank or the gas tank. The subsequent attempt to start or to resume normal operation of the vehicle causes the fuel pump to create a vacuum on the inlet side of the pump. Since the liquid fuel or the gasoline in the fuel storage tank is located at a lower level, a slight vacuum is needed to induce this liquid to flow. This reduced pressure creates more fuel vaporization until the fuel pump is unable to supply sufficient gasoline for smooth engine performance, at which time "vapor-lock" condition is experienced.

The present inventive device, a vertical bypass fuel line attachment and check valve, as illustrated in FIGS. 1 and 2, consists of a liquid fuel collection container mounted on a vertical bypass line in the rear axle area of the automobile. The present inventive device functions to reduce or prevent vapor-lock conditions or incipient vapor-lock conditions by (1) preventing liquid fuel from being forced back to the liquid fuel storage tank by the vaporization of fuel in the main fuel conduit, (2) by maintaining a positive pressure head on the liquid fuel so that liquid fuel is forced to the liquid fuel pump by gravity, (3) by providing a vapor trap so that vapors are not drawn back to fuel pump, and (4) by the repressing of the vaporization of the liquid fuel due to the maintenance of the positive head pressure on said fuel.

In regard to the physical placement of the present inventive device, it has been found that for maximum efficiency the collection bulb of the present device should be at as high a position as practical within the styling and space limitations of the automotive vehicle. The preferred location of the bypass line attachment and the bulb would be in the area of the trunk or rear seat space but it could also be located in the hood area especially in those automobile types that possess engines in the rear portion of the car. The elevation of the liquid fuel in the bypass line and in the collection bulb above the normal high point of the regular fuel conduit maintains a positive pressure on all the liquid fuel remaining in the fuel line, and furthermore represses the amount of liquid fuel vaporization. The location of the liquid fuel bulb or container for maximum effectiveness would be as high as possible, but preferably so that the bottom of the liquid fuel container or bulb would be in a vertical or upward direction higher than the top of the liquid fuel pump. The location of the container at least above the lowest portion of the main fuel conduit is important. The location of the container between the lowest portion of the main fuel conduit and the liquid fuel pump, with respect to elevation, would still allow positive head pressure on the fuel in the conduit and function effectively, but this location would not fully utilize the benefits of the present device. Thus, when an automotive vehicle is started or accelerated the positive pressure head of liquid fuel in the bypass conduit and in the collection bulb helps to provide liquid fuel to the fuel pump. This head pressure reduces the amount of vacuum required by the inlet side of the liquid fuel pump to obtain a sufficient liquid fuel supply, and consequently with less vacuum, less liquid fuel vaporization occurs. In addition the priming of the fuel pump with liquid fuel or gasoline is made easier with a subsequent faster starting action by the automotive engine. For purposes of illustration, when the outlet 18 of the collection bulb is two feet and the outlet 17 is three feet in vertical distance above the regular fuel conduit at point 15 then the respective head pressures of the liquid fuel at these respective levels at the point 15 are 1.044 and 1.066 atmospheres as compared to 1.0 atmosphere of pressure on the liquid fuel in the main fuel conduit at the same location without the inventive device. This positive pressure also represses vaporization so that a vaporization of 10% in a regular fuel line or conduit would be reduced through the two or three foot liquid elevation used in the aforesaid example to 8% and 7% vaporization respectively due to the additional positive pressure on a liquid fuel at this point.

The collection container in the vertical bypass conduit as shown in the schematic diagram of FIGURE 1 and FIGURE 2 as shown as a bulb, but it may be of any desired shape and furthermore may be made of metal, plastic, glass or any material suitable for containing the particular liquid fuel used in the automotive vehicle system. When vaporization occurs in the main fuel conduit due to "heat soaking" the unvaporized liquid fuel in the main fuel conduit rather than being forced back to the main liquid fuel storage container is forced by the pressure of the vaporization up the vertical bypass conduit into the collection bulb. The liquid fuel cannot be forced back directly to the main liquid fuel storage tank, since the check valve operates only in one direction as previously described. The collection container or bulb also receives trapped liquid fuel vapor in the fuel line, since these vapors cannot go directly back to the main liquid fuel storage tank due to the check valve as described above. These vapors rise at point 15 in the fuel conduit bypass line and collect above the liquid fuel in the collection container 16 so that the collection bulb serves in effect as a vapor trap. Thus, trapped liquid fuel vapors in the vertical bypass line or collection bulb are never drawn back into the regular fuel line delivery system. The check valve 11 operates in a manner so that when the pressure on the liquid fuel pump side of the valve is reduced below that in the liquid fuel storage container side, the check valve opens and liquid fuel is permitted to flow through the valve. It should be noted that even though the check valve becomes clogged, stuck, or inoperative in some manner so as to prevent the flow of liquid fuel through it, the liquid fuel can be pumped to the engine carburetor by the action of the liquid fuel pump through the bypass fuel conduit system which contains no obstructions of this type.

It is important, in the operation of the present inventive system and device, that a volume of vaporized fuel of about the total volume of the fuel conduit bypass attachment from point 14 to point 15 and including bulb 16 be kept in the system at all times. This is necessary so that a steady flow of liquid fuel will reach the fuel pump. Thus, the total volume of the intake device 10 and the conduit 9 between the intake device and the check valve should be approximately the same total volume as the liquid displacement volume from the inlet 17 of the collection container or bulb to the bypass connection point 15. When this condition is satisfied then upon starting or accelerating the automobile engine during a time of incipient vapor-lock, the liquid fuel in the elevated bulb will drain completely by the time that liquid fuel from the main liquid fuel storage container will be drawn vertically beyond the connection point 14. At this time, the check valve will open and a steady flow of liquid fuel will commence to flow directly from the liquid fuel storage container to the liquid fuel pump. Further, the total volume of the fuel conduit bypass attachment from point 15 to the collection container inlet point 17 and including the volume of the collection container of bulb 16 should also be equivalent to the maximum liquid displacement volume of the main fuel conduit 12 from point 15 to the inlet side of the fuel pump 13. The volumetric capacity of the fuel conduit from point 17 to point 15 and including the volumetric capacity of the collection container of 16 should be large enough so that no liquid fuel in the main fuel conduit 12 will be forced by the vaporization pressure over the top of the bypass attachment fuel conduit and into the opposite fuel conduit leg whose base is located at point 14. If liquid fuel should be allowed to be forced over the top of the fuel conduit bypass attachment, then when the liquid fuel reaches a point in the opposite leg of the fuel conduit lower than the lowest point in conduit 12, a siphoning effect away from the fuel pump 13 will tend to take place if the liquid columns are unbroken by vapor. Proper selection of the volumetric capacity as discussed above will eliminate this possibility and will also insure the maximum head pressure on the main liquid fuel conduit 12. It should be further noted that commercial liquid fuel pumps have some means, usually a unidirectional check valve on the inlet side of the pump, so as to prevent liquid fuel from being forced back through the main fuel conduit 12 after it enters the liquid fuel pump. Thus, only the liquid displaced volume of the main fuel conduit 12 need be considered under these circumstances. If a liquid fuel pump contains no effective means for preventing the backward flow of liquid fuel then the liquid fuel volume in the fuel pump must be taken into consideration in calculating the volume of the collection bulb in the conduit. In general, the volumetric capacity of the collection container bulb and the fuel conduit sections as hereinbefore discussed have been found to be between 100 to 300 cubic centimeters with the preferred volume of 150 to 250 cubic centimeters. Although the volumetric capacities discussed are not critical ones they still must be within practical and economical limits the equivalent volumes to ensure a constant flow of liquid fuel and thus smooth engine operation. Furthermore, it has been found that it is not desirable to make the total volume of the intake device 10 and the communicating conduit 9 larger than recommended, since when a large volume of vapor is formed in this larger volume area, then liquid fuel will not reach the point 14 by the time all the liquid fuel in the elevated bulb has been drained out into the main fuel conduit 12. Thus, under these conditions a portion of vaporized fuel will remain in the fuel line between the intake device 10 and the point 14 and eventually be drawn to the liquid fuel pump.

In order to prove and demonstrate the effectiveness of the present inventive device, a full scale laboratory apparatus, similar in all respect to FIGURE 1, was constructed and operated. The fuel line temperatures were chosen to simulate those temperatures in an average fuel delivery system on an 80 to 90° F. day and gasoline fuel of sufficient volatility to normally cause vapor-lock or incipient vapor-lock conditions was used. The gasoline used had the following volatility characteristics:

|  | Gasoline A |
|---|---|
| Reid vapor pressure | 9.0 |
| Percent evaporation at: |  |
| 158° F | 36 |
| 212° F | 70 |
| 257° F | 94 |

The collection bulb in the test device had an approximate volume of 100 cc. and a height of about six inches, while its bottom outlet was displaced approximately two feet above the main fuel conduit point of attachment with the leg of the bypass attachment (point 15).

During each test, first using the regular fuel delivery system and then again with the present inventive device in the system, liquid gasoline was drawn into the system from the gasoline storage container through the fuel conduit by an electric liquid fuel pump. The electric fuel pump was then shut down for a ten minute "heat soaked" period, during which time a "heat soaked" temperature as indicated below was induced in the fuel conduit immediately before the said fuel pump and including most of the simulated fuel line. The rest of the fuel conduit and by pass system was maintained at a normal lower temperature. During this ten minute period, fuel vaporization took place in the fuel line. After the "heat soaked" period, the electric pump was re-started and the amounts of gasoline actually pumped during the various intervals of time were recorded.

The results are summarized in the following table and indicate the effectiveness of the present invention:

conduit containing the collection container has been placed at a forward angle of approximately 45°.

Although for the purpose of illustration, the nature and operation of the present inventive device has been illustrated and described in an application to an automobile, the system is not intended to be restricted solely to such use. The vapor-lock conditions also may be generated in other types of automotive vehicles, and can also be of concern in connection with the use and operation of marine engines. It is contemplated that the fuel conduit bypass attachment system disclosed may be usefully employed under any circumstances where vapor-lock conditions and/or incipient vaporized conditions described may be found to exist. While the detailed description has been based upon a system wherein the main liquid fuel storage container is located in the rear of the vehicle, and the engine, liquid fuel pump, and carburetor located in the forward portion of the vehicle, these components may be otherwise arranged without departing from the scope of the invention even to the extent that the bulb and engine may be in the same area such as under the hood. It is also contemplated to be within the purpose and scope of the present invention that the inventive bypass attachment device may be displaced to the front, to the rear, or laterally as required, for example, by space and styling considerations, provided only that the collection container has the approximate relationship to the fuel pump as regards relative heights.

What is claimed is:

1. In an automotive vehicle having a front end and a rear axle and which includes a liquid fuel pump having a suction inlet, a main liquid fuel storage container having an outlet conduit which communicates with an intake device located within the main container, and a main fuel conduit communicating between said suction inlet and said outlet conduit, a fuel conduit bypass attachment comprising: an inverted U-shaped bypass fuel conduit rising in an upward direction above, and having each leg of the inverted U communicating with the main fuel conduit; uni-directional flow means located in the main conduit between the points of communication of the bypass conduit legs, with the main conduit whereby liquid fuel is allowed to flow from the liquid fuel storage tank toward the fuel pump; and a liquid fuel container having an inlet and an outlet communicating with and located in that leg of the inverted U bypass conduit which is

| Gasoline | Equipment | Temp., ° F., of Fuel Line | Fuel Line Temp., ° F., Before Pump | Average No. of Tests | Gasoline Pumped in— | | | | | |
|---|---|---|---|---|---|---|---|---|---|---|
|  |  |  |  |  | 5 Sec. | 10 Sec. | 15 Sec. | 20 Sec. | 25 Sec. | 30 Sec. |
| A | Bypass | 142.5–144 | 158–153 | 2 | 50 | 82 | 125 | 160 | 202 | 245 |
|  | Regular | 144 | 153 | 2 | 32 | 65 | 105 | 147 | 190 | 227 |
| A+8% Pentane | Bypass | 142 | 152 | 1 | 45 | 75 | 120 | 150 | 190 | 235 |
|  | Regular | 142 | 153 | 1 | 40 | 60 | 105 | 145 | 190 | 225 |
| A+15% Pentane | Bypass | 142–143 | 144–149 | 2 | 40 | 65 | 110 | 142 | 180 | 220 |
|  | Regular | 142–142.5 | 147–148 | 3 | 35 | 58 | 87 | 128 | 171 | 213 |

Figure 3:
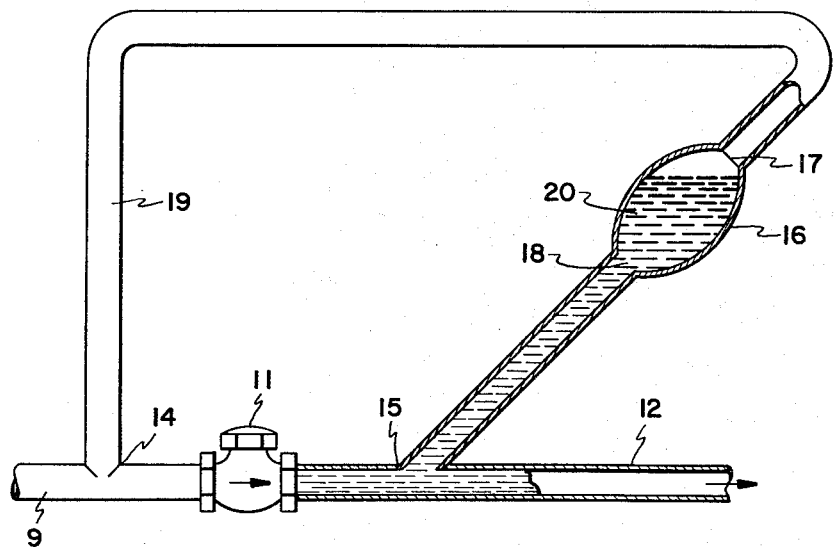
FIGURE 3 is a schematic diagram of the inventive device in an inclined position.

Furthermore, it has been discovered that by disposing the fuel conduit bypass attachment of the present invention at a forward angle of from 30 to 60 degrees but preferably at approximately 45 degrees (as shown in FIGURE 3) with its longitudinal axis substantially aligned with the longitudinal axis of the automotive chassis so that the top of the collection container or bulb is disposed toward the front of the vehicle, the inertial effect of the liquid fuel in the fuel line tends to be overcome and in this way the portion of the liquid fuel in the collection bulb can be used to promote the forward flow of fuel toward the fuel pump. FIGURE 3 illustrates the simplest inclined position wherein one leg of the inverted U bypass located between the directional flow means and the fuel pump.

2. A fuel conduit bypass attachment as defined in claim 1 wherein said outlet of the liquid fuel container is located at a higher elevation than the fuel pump.

3. A fuel conduit bypass attachment as defined in claim 1 wherein the total volume of the liquid fuel container together with the volume of the conduit from the lower outlet of the container to the point of communication with the main fuel conduit is approximately equivalent in volume to the total volume of the liquid fuel intake device together with the volume of the outlet conduit from the intake device to the uni-directional flow means, and is further approximately equivalent in volume to the total volume of the main fuel conduit from the said point of communication to the suction inlet of the fuel pump.

4. A fuel conduit bypass attachment as defined in claim 3 wherein the total volume is in the range of from 150 to 250 cc.

5. A fuel conduit bypass attachment as defined by claim 1 wherein the said directional flow means comprises a check valve.

6. A fuel conduit bypass attachment as defined in claim 1 wherein that leg of the inverted U containing the liquid fuel container is placed at a forward angle of from 30 to 60° so that the liquid container is inclined toward the front end of said automotive vehicle.

7. A fuel conduit bypass attachment as defined in claim 1 wherein that leg of the inverted U containing the liquid fuel container is placed at a forward angle of approximately 45° so that the liquid container is inclined toward the front end of said automotive vehicle.

References Cited in the file of this patent

UNITED STATES PATENTS 2,157,089   Storch et al. _____ May 2, 1939